US010700821B2

(12) United States Patent
Andersson et al.

(10) Patent No.: US 10,700,821 B2
(45) Date of Patent: Jun. 30, 2020

(54) CLEAR SOFT BUFFER PARTIALLY USING NDI

(71) Applicant: Telefonaktiebolaget LM Ericsson (publ), Stockholm (SE)

(72) Inventors: Mattias Andersson, Sundbyberg (SE); Stefan Parkvall, Bromma (SE); Sara Sandberg, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/474,930

(22) PCT Filed: Dec. 19, 2017

(86) PCT No.: PCT/IB2017/058161
§ 371 (c)(1),
(2) Date: Jun. 28, 2019

(87) PCT Pub. No.: WO2018/127756
PCT Pub. Date: Jul. 12, 2018

(65) Prior Publication Data
US 2019/0327032 A1  Oct. 24, 2019

Related U.S. Application Data

(60) Provisional application No. 62/442,682, filed on Jan. 5, 2017.

(51) Int. Cl.
*G01R 31/08* (2020.01)
*H04L 1/18* (2006.01)
(Continued)

(52) U.S. Cl.
CPC .......... *H04L 1/1835* (2013.01); *H04L 1/0057* (2013.01); *H04L 1/1671* (2013.01);
(Continued)

(58) Field of Classification Search
CPC ... H04L 1/1845; H04L 1/1874; H04L 1/1835; H04L 1/1864; H04L 1/1812;
(Continued)

(56) References Cited

U.S. PATENT DOCUMENTS 8,189,559 B2 * 5/2012 Pi ........................... H04L 1/0013
370/351
8,503,316 B2 * 8/2013 Chen ...................... H04L 1/1822
370/252

(Continued)

OTHER PUBLICATIONS

Author Unknown, "Technical Specification Group Radio Access Network; Evolved Universal Terrestrial Radio Access (E-UTRA); Medium Access Control (MAC) protocol specification (Release 14)," Technical Specification 36.321, Version 14.0.0, 3GPP Organizational Partners, Sep. 2016, 96 pages.
(Continued)

*Primary Examiner* — Hanh N Nguyen
(74) *Attorney, Agent, or Firm* — Withrow & Terranova, PLLC

(57) ABSTRACT

Systems and methods are disclosed herein that allow a radio access node to command a wireless device to clear parts of a soft buffer for a Hybrid Automatic Repeat Request (HARQ) process. In some embodiments, a method for a wireless device in a wireless communications system comprises receiving control information comprising information pertaining to whether the wireless device should partially clear a soft buffer for a HARQ process, deciding whether to partially clear the soft buffer for the HARQ process based on the information comprised in the control information, and partially clearing the soft buffer for the HARQ process upon deciding to partially clear the soft buffer for the HARQ process. In this manner, corrupted soft information can be cleared from the soft buffer while retaining uncorrupted soft information in the soft buffer.

27 Claims, 10 Drawing Sheets

(51) Int. Cl.
*H04L 1/00* (2006.01)
*H04L 1/16* (2006.01)
*H04W 72/04* (2009.01)

(52) U.S. Cl.
CPC .......... *H04L 1/1812* (2013.01); *H04L 1/1861* (2013.01); *H04W 72/0413* (2013.01)

(58) Field of Classification Search
CPC ... H04L 1/1822; H04L 1/0057; H04L 1/1861; H04L 1/1671; H04L 5/0053; H04L 5/0076; H04L 5/0005; H04L 1/038; H04L 1/0013; H04W 28/16; H04W 28/04
USPC .......................................................... 370/235
See application file for complete search history.

(56) References Cited

U.S. PATENT DOCUMENTS

| | | | | |
|---|---|---|---|---|
| 8,638,741 | B2 * | 1/2014 | Hariharan | H04L 1/1887 370/329 |
| 8,670,377 | B2 * | 3/2014 | Yi | H04L 1/1812 370/328 |
| 9,172,520 | B1 * | 10/2015 | Cheng | H04L 1/1835 |
| 2007/0259665 | A1 * | 11/2007 | Chiu | H04L 1/1671 455/436 |

OTHER PUBLICATIONS

InterDigital Communications, "R2-168460: Scheduling and support for URLCC service multiplexing," Third Generation Partnership Project (3GPP), TSG-RAN WG2 Meeting #96, Nov. 14-18, 2016, 6 pages, Reno, USA.

Samsung, "R1-1609059: Multiplexing URLLC and eMBB in DL," Third Generation Partnership Project (3GPP), TSG RAN WG1 Meeting #86bis, Oct. 10-14, 2016, 5 pages, Lisbon, Portugal.

International Search Report and Written Opinion for International Patent Application No. PCT/IB2017/058161, dated Apr. 4, 2018, 16 pages.

International Preliminary Report on Patentability for International Patent Application No. PCT/IB2017/058161, dated Dec. 7, 2018, 24 pages.

* cited by examiner

Schematic description of LTE circular buffer for rate matching

Transmissions 2-4 in example 1

Transmissions 2-4 in example 2

Transmissions 1 and 2 in example 3

*Soft information is added to the soft buffer for each transmission*

CLEAR SOFT BUFFER PARTIALLY USING NDI

RELATED APPLICATIONS

This application is a 35 U.S.C. § 371 national phase filing of International Application No. PCT/IB2017/058161, filed Dec. 19, 2017, which claims the benefit of provisional patent application Ser. No. 62/442,682, filed Jan. 5, 2017, the disclosures of which are hereby incorporated herein by reference in their entireties.

TECHNICAL FIELD

The present disclosure relates to Hybrid Automatic Repeat Request (HARQ) with soft combining and, in particular, to partially clearing a soft buffer to improve soft combining in the event of reception of corrupt data.

BACKGROUND

The basis for the Long Term Evolution (LTE) Hybrid Automatic Repeat Request (HARQ) mechanism is multiple stop-and-wait protocols, each operating on a single transport block. In LTE, multiple stop-and-wait processes are applied in parallel to allow continuous transmission of data. There is one HARQ entity per terminal and per component carrier. Spatial multiplexing is supported with one HARQ process per transport block transmitted in parallel. The HARQ processes belong to the same HARQ entity, but have independent HARQ acknowledgements (ACKs).

An important part of LTE HARQ is the use of soft combining, which implies that the receiver combines the received signal from multiple transmission attempts. When using soft combining, the erroneously received packet is stored in a buffer memory and is later combined with one or several retransmissions. The decoder is operating on the combined soft buffer, thereby producing a more reliable output than if only a single transmission would have been used.

HARQ with soft combining is typically based on Incremental Redundancy (IR), which includes Chase Combining (CC) as a special case. With IR, each retransmission may be different to the previous transmission, but all retransmissions represent the same information bits. Whenever a retransmission is needed, the retransmission typically uses a different set of coded bits than the previous transmission. The receiver combines the soft information of the first transmission with the soft information of the retransmission. If exactly the same coded bits are used for the first transmission and the retransmission, i.e. CC, the combined soft information corresponds to a codeword with the same length as the first transmission. If any bits that were not part of the first transmission are included in the retransmission, the combined soft information corresponds to a longer codeword with lower code rate. In LTE, the (re)transmissions and IR are based on a circular buffer together with different Redundancy Versions (RVs). The LTE turbo code is a systematic code of rate 1/3, i.e. ⅓ of the coded bits are systematic bits, or information bits, and ⅔ of the coded bits are parity bits. A codeword, after sub-block interleaving, $[s_0, s_1, \ldots, s_{k-1}, p_0^1, p_0^2, \ldots, p_{k-1}^1, p_{k-1}^2]$, is put into a circular buffer. Each RV indicates a starting point in the circular buffer. To generate n bits of redundancy version T, n bits are read clock-wise from the circular buffer, starting at the position indicated by RV T and wrapping around to $s_0$ if the end of the codeword is reached. The number of bits n to be transmitted can be determined from the scheduling information. FIG. 1 is a schematic description of the LTE circular buffer for rate matching.

When the receiver combines soft information, it is important to know when new information arrives and the soft buffer should be cleared instead of being combined with the latest transmission prior to decoding. The soft information for a coded bit can, for example, represent the Log-Likelihood Ratio (LLR) of the coded bit, or a scaled version of the LLR. Soft information is usually quantized in the soft buffer memory, so that the soft value of each coded bit is represented by a finite number of bits. Clearing the soft buffer for a coded bit could, for example, entail setting the representation in the soft buffer memory to a combination that represents an LLR of 0. In LTE, an explicit New Data Indicator (NDI) is included for each of the scheduled transport blocks along with other downlink scheduling information on the Physical Downlink Control Channel (PDCCH).

For downlink data transmission, the NDI is toggled for each new transport block. When the User Equipment device (UE) receives a downlink scheduling assignment, it checks the NDI to determine whether the current transmission should be soft combined with the received data currently in the soft buffer for the HARQ process in question, or if the soft buffer should be cleared. In addition to the NDI, the HARQ process number and the RV are also explicitly signaled in the scheduling assignment for each downlink transmission. Each transport block is acknowledged by transmitting an ACK/Negative Acknowledgement (NACK) of one or two bits on the uplink. An LTE transport block can consist of one or more codeblocks. A Cyclic Redundancy Check (CRC) is appended to the information bits in each codeblock so the receiver can determine with high probability whether a single codeblock is correctly decoded.

In general, RV 0 contains a larger fraction of systematic bits than other RVs, which makes it easier to decode on its own than other RVs. Therefore, RV 0 should be used when transmitting a new transport block.

The above description focuses on the existing LTE mechanisms, but the relevant parts may also be true for the new New Radio (NR) standard as well. In particular:

The Low-Density Parity-Check (LDPC) codes proposed for NR are easier to decode when the receiver has access to a large fraction of the systematic bits than to mainly parity bits, and they support IR HARQ in a similar way as the LTE turbo codes.

Rate matching based on a circular buffer is proposed for NR.

SUMMARY

Systems and methods are disclosed herein that allow a radio access node to command a wireless device to clear parts of a soft buffer for a Hybrid Automatic Repeat Request (HARQ) process. In some embodiments, a method for a wireless device in a wireless communications system comprises receiving control information comprising information pertaining to whether the wireless device should partially clear a soft buffer for a HARQ process, deciding whether to partially clear the soft buffer for the HARQ process based on the information comprised in the control information, and partially clearing the soft buffer for the HARQ process upon deciding to partially clear the soft buffer for the HARQ process. In this manner, corrupted soft information can be cleared from the soft buffer while retaining uncorrupted soft information in the soft buffer.

In some embodiments, HARQ feedback is provided for each code block, and partially clearing the soft buffer for the HARQ process comprises clearing, from the soft buffer, parts of soft information stored in the soft buffer that correspond to a code block.

In some embodiments, the information pertaining to whether the wireless device should partially clear the soft buffer for the HARQ process comprises a New Data Indicator (NDI) and a Redundancy Version (RV) indicator. In some embodiments, deciding whether to partially clear the soft buffer for the HARQ process comprises deciding to partially clear the soft buffer for the HARQ process if a combination of the NDI and the RV indicator is a predefined combination. In some embodiments, deciding whether to partially clear the soft buffer for the HARQ process comprises deciding to partially clear the soft buffer for the HARQ process if the NDI is toggled and the RV indicator indicates a RV other than RV 0.

In some embodiments, the information pertaining to whether the wireless device should partially clear the soft buffer for the HARQ process comprises information that informs the wireless device of which bits represented by soft information in the soft buffer have been corrupted and partially clearing the soft buffer for the HARQ process comprises clearing a part of the soft buffer that corresponds to the bits that have been corrupted. In some embodiments, the bits that have been corrupted are bits that were punctured by Ultra-Reliable and Low-Latency Communications (URLLC).

In some embodiments, the information pertaining to whether the wireless device should partially clear the soft buffer for the HARQ process comprises a bit that indicates whether the control information points to an actual downlink transmission or the wireless device should partially clear the soft buffer. In some embodiments, if the bit indicates that the wireless device should partially clear the soft buffer, the control information further comprises one or more bits that indicate where to start clearing the soft buffer. In some embodiments, the one or more bits that indicate where to start clearing the soft buffer comprises one or more bits normally used for a NDI, one or more bits normally used to indicate the Modulation and Coding Scheme (MCS) for an associated transport block, and/or one or more bits normally used to indicate time-frequency resources in which an associated transport block is transmitted. In some embodiments, partially clearing the soft buffer comprises partially clearing the soft buffer starting at location in the soft buffer indicated by the one or more bits.

In some embodiments, partially clearing the soft buffer for the HARQ process comprises clearing parts of the soft buffer for the HARQ process that correspond to coded bits in a downlink transmission.

In some embodiments, partially clearing the soft buffer for the HARQ process comprises clearing soft information that corresponds to a latest downlink transmission (transmission T−1) that corresponds to the coded bits for the downlink transmission (transmission T) but not soft information from the soft buffer for transmissions (transmissions T−2, T−3, . . . ) occurring before the latest transmission.

In some embodiments, the method further comprises receiving a downlink transmission and performing soft combining and decoding of the downlink transmission.

In some embodiments, the information pertaining to whether the wireless device should partially clear the soft buffer for the HARQ process comprises a NDI and a RV indicator, and the NDI and the RV indicator are separate indicators. In some other embodiments, the information pertaining to whether the wireless device should partially clear the soft buffer for the HARQ process comprises a NDI and a RV indicator, and the NDI and the RV indicator are a jointly encoded indicator. In some embodiments, the NDI comprises more than one bit such that the NDI is toggled when the NDI changes values.

Embodiments of a wireless device are also disclosed. In some embodiments, a wireless device for a wireless communications system is adapted to receive control information comprising information pertaining to whether the wireless device should partially clear a soft buffer for a HARQ process, decide whether to partially clear the soft buffer for the HARQ process based on the information comprised in the control information, and partially clearing the soft buffer for the HARQ process upon deciding to partially clear the soft buffer for the HARQ process.

In some embodiments, a wireless device for a wireless communications system comprises at least one transceiver, at least one processor, and memory comprising instructions executable by the at least one processor whereby the wireless device is operable to receive control information comprising information pertaining to whether the wireless device should partially clear a soft buffer for a HARQ process, decide whether to partially clear the soft buffer for the HARQ process based on the information comprised in the control information, and partially clearing the soft buffer for the HARQ process upon deciding to partially clear the soft buffer for the HARQ process.

In some embodiments, a wireless device for a wireless communications system comprises a receiving module, a deciding module, and a clearing module. The receiving module is operable to receive control information comprising information pertaining to whether the wireless device should partially clear a soft buffer for a HARQ process. The deciding module is operable to decide whether to partially clear the soft buffer for the HARQ process based on the information comprised in the control information. The clearing module is operable to, upon the deciding module making a decision to partially clear the soft buffer for the HARQ process, partially clear the soft buffer for the HARQ process.

Embodiments of a method for a network node in a wireless communications system are also disclosed. In some embodiments, a method for a network node in a wireless communications system comprises transmitting, to a wireless device, or causing another network node to transmit, to the wireless device, information pertaining to whether wireless device is to partially clear a soft buffer for a HARQ process.

In some embodiments, HARQ feedback is provided for each code block, and partially clearing the soft buffer for the HARQ process comprises clearing, from the soft buffer, parts of soft information stored in the soft buffer that correspond to a code block.

In some embodiments, the information pertaining to whether the wireless device is to partially clear the soft buffer for the HARQ process comprises a NDI and a RV indicator. In some embodiments, transmitting the information comprises transmitting control information comprising the NDI and the RV indicator such that a combination of the NDI and the RV indicator is a predefined combination that indicates that the wireless device is to partially clear the soft buffer for the HARQ process. In some embodiments, transmitting the information comprises transmitting control information comprising the NDI and the RV indicator such that the NDI is toggled and the RV indicator indicates a RV other than RV 0 to thereby indicate that the wireless device is to partially clear the soft buffer for the HARQ process.

In some embodiments, the information pertaining to whether the wireless device should partially clear the soft buffer for the HARQ process comprises information that informs the wireless device of which bits represented by soft information in the soft buffer have been corrupted. In some embodiments, the bits that have been corrupted are bits that were punctured by URLLC.

In some embodiments, the information pertaining to whether the wireless device should partially clear the soft buffer for the HARQ process comprises a bit that indicates whether control information comprising the information points to an actual downlink transmission or the wireless device should partially clear the soft buffer. In some embodiments, if the bit indicates that the wireless device should partially clear the soft buffer, transmitting the control information further comprises transmitting the control information such that the control information comprises one or more bits that indicate where to start clearing the soft buffer. In some embodiments, the one or more bits that indicate where to start clearing the soft buffer comprises one or more bits normally used for a NDI, one or more bits normally used to indicate MCS for an associated transport block, and/or one or more bits normally used to indicate time-frequency resources in which an associated transport block is transmitted.

In some embodiments, the information pertaining to whether the wireless device should partially clear the soft buffer for the HARQ process comprises a NDI and a RV indicator, and the NDI and the RV indicator are a jointly encoded indicator.

Embodiments of a network node for a wireless communications system are also disclosed. In some embodiments, a network node for a wireless communications system is adapted to transmit, to a wireless device, or cause another network node to transmit, to the wireless device, information pertaining to whether the wireless device is to partially clear a soft buffer for a HARQ process.

In some embodiments, a network node for a wireless communications system comprises at least one processor and memory comprising instructions executable by the at least one processor whereby the network node is operable to transmit, to a wireless device, or cause another network node to transmit, to the wireless device, information pertaining to whether the wireless device is to partially clear a soft buffer for a HARQ process.

In some embodiments, a network node for a wireless communications system comprises a transmitting module operable to transmit, to a wireless device, or cause another network node to transmit, to the wireless device, information pertaining to whether the wireless device is to partially clear a soft buffer for a HARQ process.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
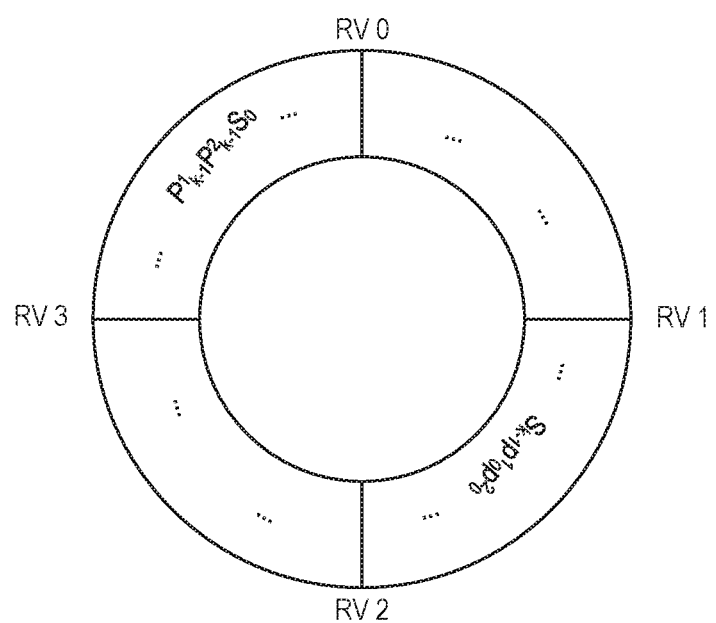
FIG. 1 is a schematic description of the Long Term Evolution (LTE) circular buffer for rate matching.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network or a gNB in a 3GPP New Radio (NR) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G), or NR, concepts, beams may be used instead of cells and, as such, it is important to note that the concepts described herein are equally applicable to both cells and beams.

One problem with existing Hybrid Automatic Repeat Request (HARQ) solutions is that when a transmission is severely damaged, for example by Ultra-Reliable and Low-Latency Communications (URLLC), Sounding Reference Signal (SRS), etc., puncturing enhanced Mobile Broadband (eMBB), or by strong interference, the corrupted soft information is kept in the soft buffer. When a retransmission is received, the new soft information is combined with the corrupted soft information from the previous transmission attempt. This may result in decoding failure also after receiving a retransmission that could have been correctly decoded on its own or together with non-corrupt soft information from the previous transmission attempt.

In accordance with some embodiments of the present disclosure, in cases when a transmission is severely damaged, for example by URLLC puncturing or by strong interference, New Data Indicator (NDI) and Redundancy Version (RV) signaling could be used to signal that the soft buffer should be partially cleared to remove the corrupted soft information from the buffer. Specific combinations of NDI and RV will have different meanings and the soft buffer can thereby be partly cleared, without creating any additional signaling.

If a transmission is severely damaged, the receiving node gets corrupted data in its soft buffer. The transmitter can tell the receiver to delete the whole soft buffer of the corresponding HARQ process when retransmitting the data. However, some of the received data corresponding to the same codeword in the soft buffer might be uncorrupted. The present disclosure allows the receiving node to keep the uncorrupted soft information and combine it with a new transmission without introducing any additional signaling.

Embodiments of the present disclosure allows a radio access node (e.g., an eNB or gNB, where gNB is a term used to refer to a radio access node in NR) to command a wireless device (e.g., a UE) to clear parts of the soft buffer corresponding to corrupted transmissions due to, for example, URLLC traffic to another wireless device. This potentially allows the wireless device to decode a transport block with fewer retransmissions. Embodiments of the present disclosure require no extra signaling between the wireless device and radio access node but instead reuses rarely used combinations of the NDI and RV fields in the control information. The control information may be the Downlink Control Information (DCI), but can also be other types of control information if embodiments of the present disclosure are applied on, for example, sidelink transmissions.

Figure 2:
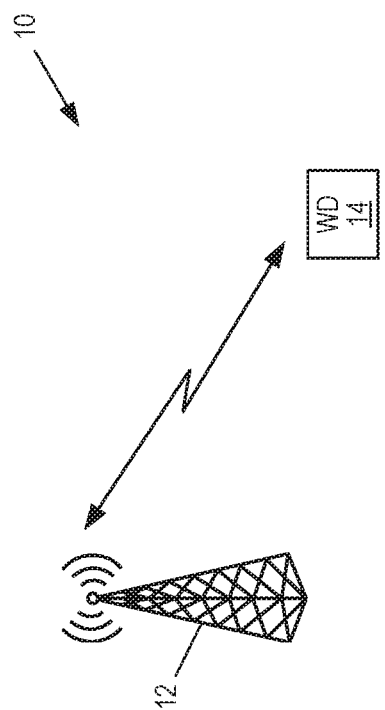
FIG. 2 illustrates one example of a wireless communications system in which embodiments of the present disclosure may be implemented.

FIG. 2 illustrates one example of a wireless communications system 10 (e.g., a cellular network) in which embodiments of the present disclosure may be implemented. As illustrated, the wireless communications system 10 includes a radio access node 12 that provides wireless, or radio, access to a wireless device 14. In some embodiments, the wireless communications system 10 is a 3GPP LTE network in which case the radio access node 12 may be an eNB (and thus referred to herein as an eNB 12). In some other embodiments, the wireless communications system 10 is a 3GPP NR network in which case the radio access node 12 may be a gNB (and thus referred to therein as a gNB 12). Notably, for the following description, the radio access node 12 is an eNB 12 and the wireless device 14 is a UE (and thus referred to herein as a UE 14); however, the present disclosure is not limited thereto.

In some cases, a transmission from the eNB 12 to the UE 14 can be severely damaged, for example by puncturing the transmission, i.e. by replacing the transmitted symbols by other symbols intended for another, or the same, UE, or by strong interference. The puncturing could for example be URLLC or SRS puncturing eMBB. In these cases, the NDI and RV signaling could be used to signal that soft information for the damaged transmission should be removed from the soft buffer, while soft information from other transmissions of the current HARQ process can be kept. The signaling is achieved by redefining the meaning of certain combinations of the NDI and RV without requiring any additional signaling.

Since RV 0 contains a larger fraction of systematic bits than other RVs, it is easier to decode on its own than other RVs. Therefore, a new transport block should be scheduled using RV 0 and there is no reason for the eNB 12 to toggle the NDI while indicating an RV≠0. For NR, or a later LTE release, embodiments of the present disclosure define a useful meaning for the combination of toggled NDI and RV≠0. Several different alternatives for how this is done are disclosed herein. For all different alternatives, not toggling the NDI means that the values in the soft buffer should be kept, i.e. the current LTE functionality is kept. If the NDI is toggled and RV=0 is indicated, a new transport block is transmitted and the UE should clear its soft buffer. Conversely, a new meaning is defined for situations in which the NDI is toggled and RV≠0 is indicated.

Notation:
Denote the RV in the current Physical Downlink Control Channel (PDCCH) by $RV_T$.
Denote the RV in the last received PDCCH for the same HARQ process by $RV_{T-1}$.

In a first alternative (Alternative 1), the meaning of toggling the NDI depends only on the RV used and signaled for the current transmission, i.e. $RV_T$. The UE behavior is changed to the following:
If $RV_T=0$ and the NDI is toggled, clear the whole soft buffer for the current HARQ process and assume that a new transport block is transmitted.
If $RV_T \neq 0$ and the NDI is toggled, clear the soft buffer part corresponding to the coded bits in the current transmission, and soft combine the rest of the soft buffer with the current transmission. Do not assume that a new transport block is transmitted.

Figure 3:
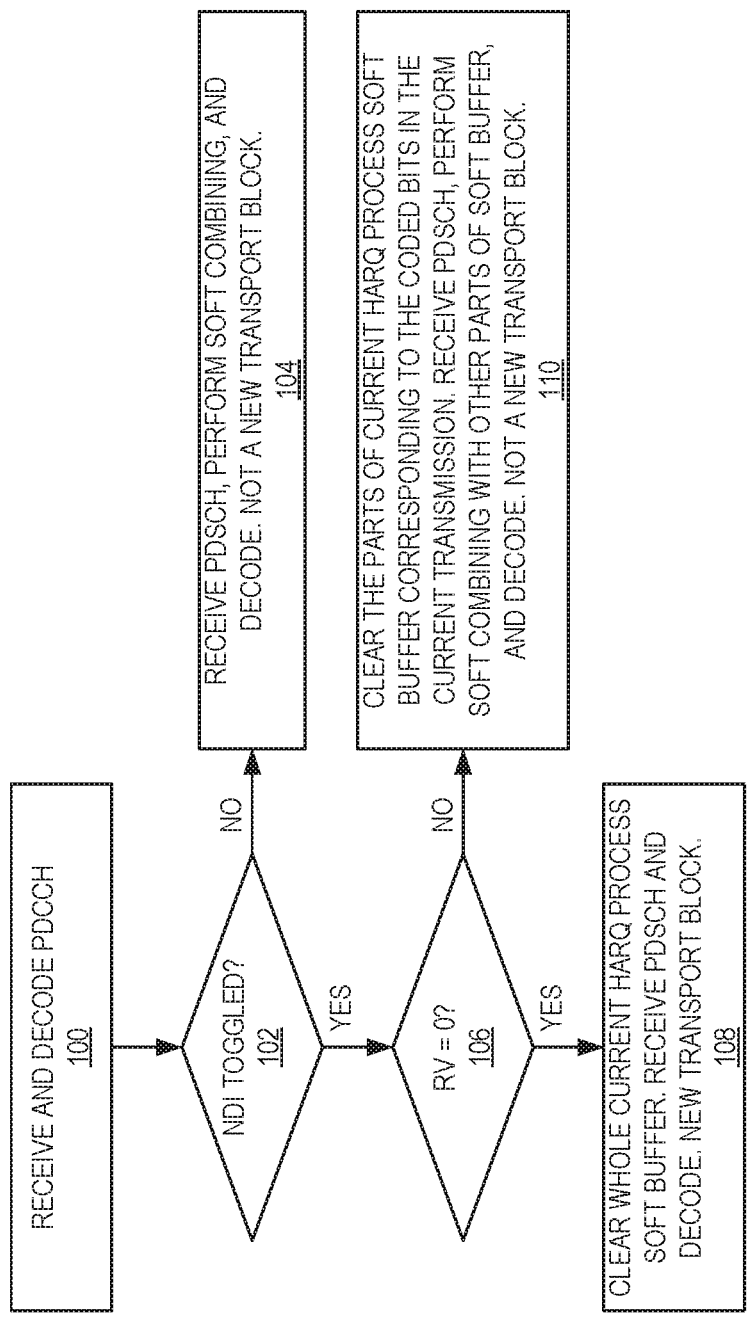
FIG. 3 is a flow chart that illustrates the operation of a wireless device according to some embodiments of the present disclosure.

FIG. 3 is a flow chart that illustrates Alternative 1 according to some embodiments of the present disclosure. As illustrated, the UE 14 receives and decodes a PDCCH (step 100). The PDCCH includes DCI for a downlink transmission to the UE 14, where the DCI includes the RV and NDI. The UE 14 determines whether the NDI is toggled (step 102). That is, the UE 14 determines whether the NDI is set to a value that indicates new data. If the NDI is not toggled (step 102; NO), the UE 14 receives the corresponding downlink transmission on the Physical Downlink Shared Channel (PDSCH), performs soft combining, and decodes the downlink transmission (step 104). The UE 14 assumes that the received data is not a new transport block (i.e., assumes that the downlink transmission is a re-transmission).

If the NDI is toggled (step 102; YES), the UE 14 determines whether the indicated RV is equal to 0 (step 106). If so (step 106; YES), the UE 14 clears the whole current soft buffer for the current HARQ process and receives and decodes the downlink transmission received on the PDSCH (step 108). The UE 14 assumes that a new transport block is transmitted. If the NDI is toggled and the indicated RV is not equal to 0 (step 106; NO), then the UE 14 clears parts of the current HARQ process soft buffer corresponding to the coded bits in the current transmission, receives the downlink transmission on the PDSCH, performs soft combining with the other parts of the soft buffer, and decodes the downlink transmission (step 110). The UE 14 assumes that a new transport block is not transmitted.

Note that, as used herein, "clearing the soft buffer" refers to any action by which the soft information stored for a coded bit is set to some default value. For example, the soft information for a coded bit can for example represent the Log-Likelihood Ratio (LLR) of the coded bit, or a scaled version of the LLR. Soft information is usually quantized in the soft buffer memory, so that the soft value of each coded bit is represented by a finite number of bits. Clearing the soft buffer for a coded bit, in this case, could for example entail setting the soft information for the coded bit in the soft buffer to a bit combination that represents an LLR of 0.

A second alternative (Alternative 2) is a variant of Alternative 1, where only soft information from the latest received transmission in the soft buffer is cleared. To make this possible, two different soft buffers may be needed, where one contains only soft information from the latest transmission while the other contains a combination of soft information from all transmissions occurring before the latest transmission. Thus, for Alternative 2, the process of FIG. 3 is modified in step 110 to partially clear the soft information in the soft buffer for the latest transmission (transmission T−1) that corresponds to the coded bits for the current transmission (transmission T), but not soft information from the buffer for transmissions occurring before the latest transmission (transmissions T−2, T−3, . . . ).

The advantage of Alternative 2 is that correct soft information received in earlier transmissions is not cleared, even though the recently received soft information for the same bits was corrupt. The decoder thereby has more soft information to base its decision on and decoding is more likely to succeed.

For both Alternative 1 and Alternative 2, the proposed method works on the same level as the HARQ feedback.
- If HARQ feedback is sent for each transport block, like in LTE, this method can be used to clear parts of the soft information corresponding to a transport block from the soft buffer.
- If HARQ feedback is sent for each code block, this method can be used to clear parts of the soft information corresponding to a code block from the soft buffer.

Examples of the soft buffer updates using the different alternative solutions are provided below. In the examples below all transmissions are using the same HARQ process. There could be other transmissions in between for other HARQ processes, but they are not shown in the tables.

In some embodiments, improvements to both alternatives described above are provided, where these improvements require additional signaling. Sometimes, it is enough for the UE 14 to know which bits have been corrupted to enable successful decoding of a codeblock. Therefore, it would be beneficial if the eNB 12 has a way of informing the UE 14 of this without scheduling a retransmission. A similar method as proposed above can be used for this. Specifically, in some embodiments, an additional bit is added to the control information, e.g. the DCI, indicating whether the control information points to an actual transmission, or merely indicates that the UE 14 should clear part of the soft buffer. If the bit is set to one value (e.g., 1), the UE 14 operates as normal. If the bit is set to the other value (e.g., 0), the UE 14 determines which part of the soft buffer the current control information points to, had it been an actual transmission. The UE 14 then clears this part of the soft buffer and tries to decode the rest of the contents of the soft buffer. Without a retransmission, the decoding performance can be sensitive to exactly which parts of the soft buffer are cleared. If the corrupted bits occur far from the beginning of an RV, many non-corrupted bits will be cleared by this procedure. Therefore, it would be beneficial to have a finer granularity of where to start clearing the soft buffer. A finer granularity may be achieved by using more bits to describe starting points in the circular buffer. LTE uses four different RVs, described by two bits. In the case when the new transport block is not transmitted since the additional bit is set to 0, any combinations of e.g. NDI, MCS, and the bits used to indicate which time-frequency resources a transmission uses, that are not used when the transport block is not actually transmitted, can be reused to indicate different starting points in the circular buffer.

Example 1

In this example, Alternative 1 is used to show how the soft buffer can be partially cleared when some bits of transmission 3 have been replaced by another transmission.

With legacy LTE, the alternatives for the eNB are: (a) to toggle the NDI and restart the transmission of this transport block without keeping any soft information in the buffer or (b) not to toggle the NDI and transmit more information that will be soft combined with the corrupted information in the soft buffer.

Figure 4:
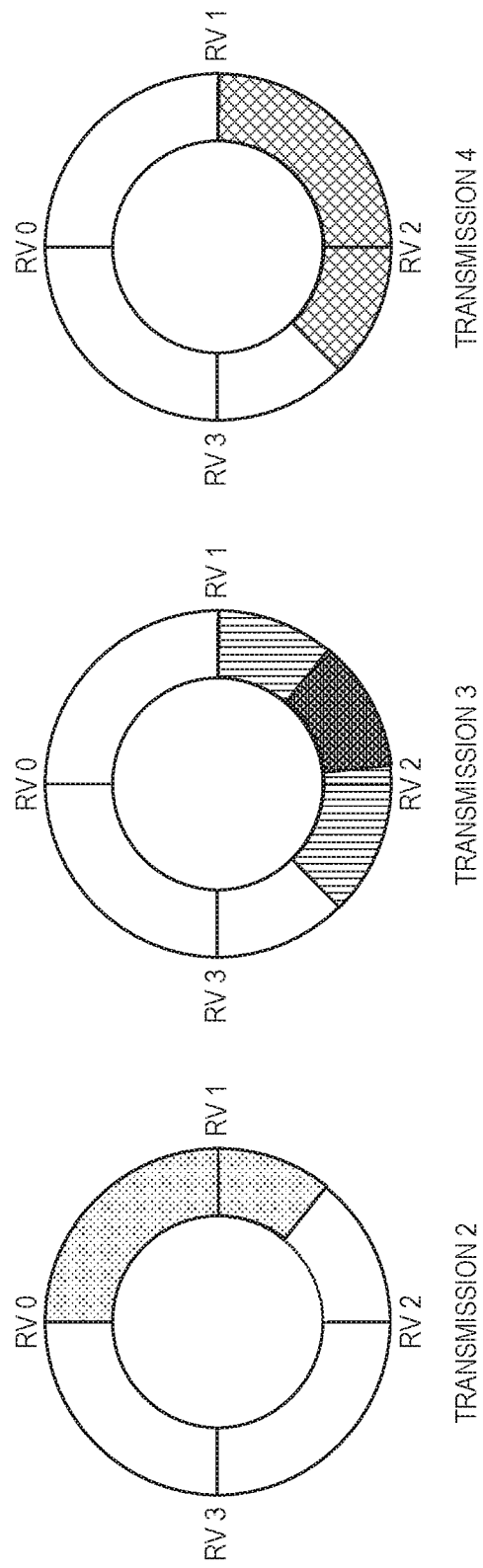
FIGS. 4 through 7 are schematic illustrations of some examples that illustrate some embodiments of the present disclosure.

FIG. 4 illustrates transmissions 2 through 4 in example 1. The marked region indicates the part of the codeword that is included in each transmission. In transmission 3, the darkest shaded part of the codeword is corrupted. In transmission 4, RV 1 is retransmitted while toggling the NDI so that the UE 14 clears the soft buffer corresponding to the bits in the transmission.

| Transmission # | NDI toggled | RV | Soft buffer status | Decoding success | Corrupted transmission? | New transport block? |
|---|---|---|---|---|---|---|
| 1 | Yes | 0 | Whole buffer cleared, soft info from transmission 1 added | Yes | | Yes |
| 2 | Yes | 0 | Whole buffer cleared, soft info from transmission 2 added | No | | Yes |
| 3 | No | 1 | Soft info in buffer from transmission 2 is soft combined with soft info from transmission 3 | No | 30% of bits replaced by another transmission or damaged due to interference | No |
| 4 | Yes | 1 | Soft info for bits involved in transmission 4 is cleared from soft buffer. Remaining soft info in buffer is soft combined with soft info from transmission 4 | Yes | | No |
| 5 | Yes | 0 | Whole buffer cleared, soft info from transmission 5 added | Yes | | Yes |

Example 2

This example is similar to example 1, but it is assumed that with the selected transmission size, the corrupted bits in transmission 3 are transmitted with both RV 1 and RV 2. That is, they are transmitted both if the starting point of the read-out from the circular buffer corresponds to RV 1 or RV 2. Therefore, the eNB 12 can choose to transmit RV 2 instead of RV 1 if the eNB 12 thinks that this will make decoding more likely to succeed. One way of choosing which RV to transmit is to choose one that clears the soft information for as few uncorrupted systematic bits as possible while still clearing the corrupted bits. Another way of choosing would be to try to transmit as many previously untransmitted coded bits as possible, while still clearing all corrupted bits from the soft buffer. Since the number of retransmitted bits must not match the number of bits in the first transmission, the number of retransmitted bits can be selected, through selection of the number of time-frequency resources and the Modulation and Coding Scheme (MCS), such that all the corrupted bits but as few other bits as possible are retransmitted and thereby cleared from the soft buffer (see example 3).

Figure 5:
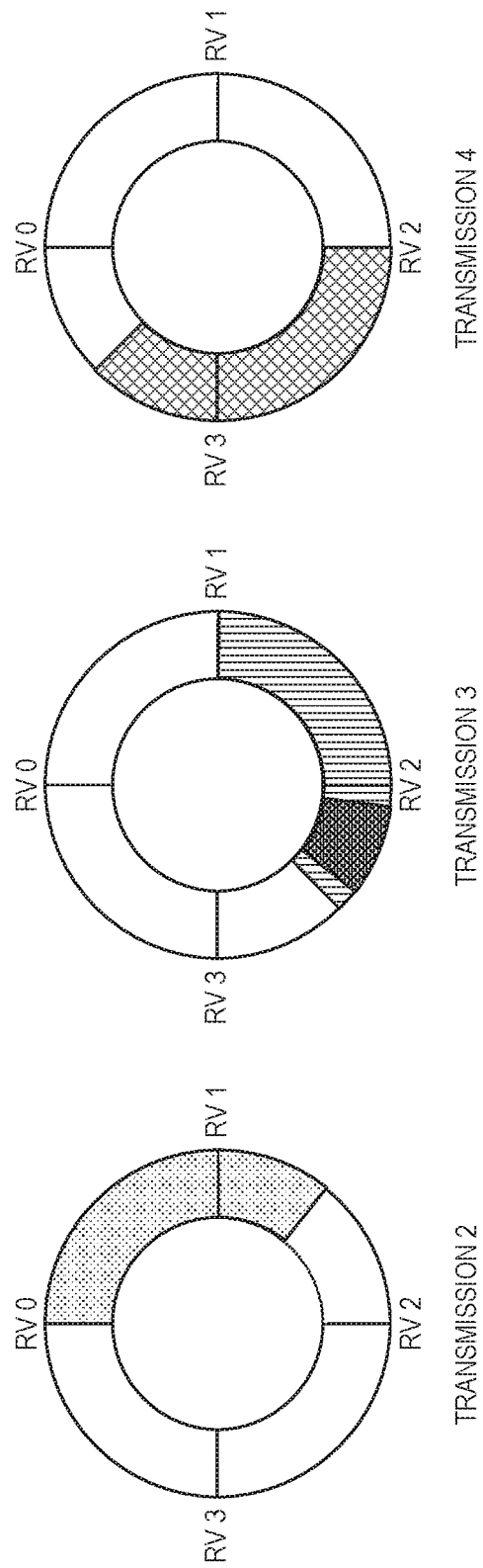

FIG. 5 illustrates transmissions 2 through 4 in example 2. The marked region indicates the part of the codeword that is included in each transmission. In transmission 3, the darkest shaded part of the codeword is corrupted. In transmission 4, RV 2 is transmitted instead of RV 1. The NDI is toggled so that the UE 14 clears the soft buffer corresponding to the bits in the transmission.

| Transmission # | NDI toggled | RV | Soft buffer status | Decoding success | Corrupted transmission? | New transport block? |
|---|---|---|---|---|---|---|
| 1 | Yes | 0 | Whole buffer cleared, soft info from transmission 1 added | Yes | | Yes |
| 2 | Yes | 0 | Whole buffer cleared, soft info from transmission 2 added | No | | Yes |
| 3 | No | 1 | Soft info in buffer from transmission 2 is soft combined with soft info from transmission 3 | No | 25% of bits replaced by another transmission or damaged due to interference | No |
| 4 | Yes | 2 | Soft info for bits involved in transmission 4 is cleared from soft buffer. Remaining soft info in buffer is soft combined with soft info from transmission 4 | Yes | | No |
| 5 | Yes | 0 | Whole buffer cleared, soft info from transmission 5 added | Yes | | Yes |

Example 3

In this example, the different transmissions use different rates, allowing a finer control of which parts of the soft buffer to clear.

Figure 6:
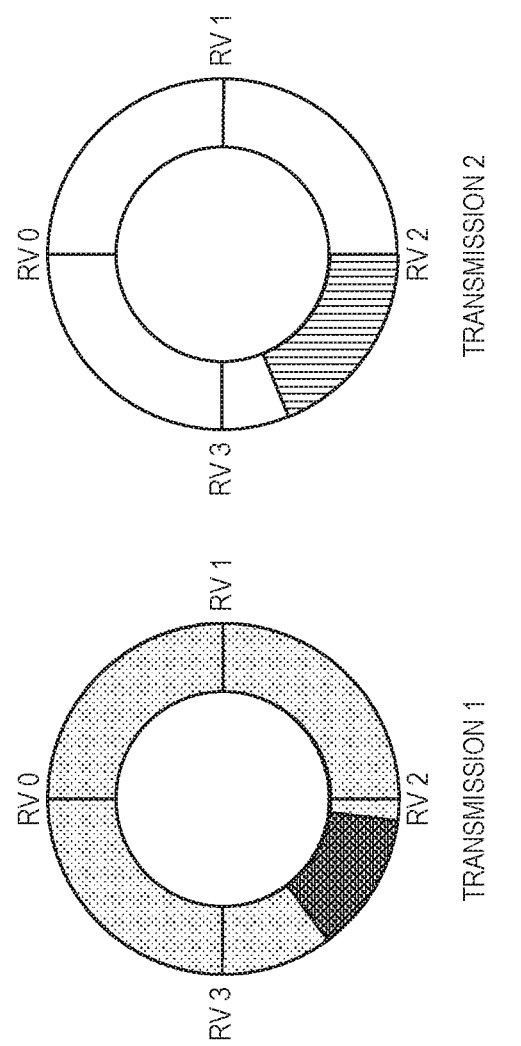

FIG. 6 illustrates transmissions 1 and 2 in example 3. The marked region indicates the part of the codeword that is included in each transmission. In transmission 1, the darkest shaded part of the codeword is corrupted. In transmission 2, RV 2 is transmitted. The NDI is toggled so that the UE 14 clears the soft buffer corresponding to the bits in the transmission. The number of bits in transmission 2 is smaller than the number of bits in transmission 1.

| Transmission # | NDI toggled | RV | Transmitted Bits | Soft buffer status | Decoding success | Corrupted transmission? | New transport block? |
|---|---|---|---|---|---|---|---|
| 1 | Yes | 0 | Whole codeword | Whole buffer cleared, soft info from transmission 1 added | No | 15% of bits replaced by another transmission or damaged due to interference | Yes |
| 2 | Yes | 2 | ¼th of the codeword | Soft info for bits involved in transmission 2 is cleared from soft buffer. Remaining soft info in buffer is soft combined with soft info from transmission 2. | Yes | | No |

-continued

| Transmission # | NDI toggled | Transmitted RV | Bits Soft buffer status | Decoding success | Corrupted transmission? | New transport block? |
|---|---|---|---|---|---|---|
| 3 | Yes | 0 | Whole buffer cleared, soft info from transmission 5 added | Yes | | Yes |

Example 4

In this example, the benefit of alternative 2 is shown. In the fifth retransmission (transmission 6), some bits are replaced by another transmission. This could make all soft information available in the buffer in principle useless if the buffer is not partially cleared, since decoding is very unlikely to succeed if more than a few percent of the bits are punctured.

| Transmission # | NDI toggled | RV | Soft buffer status | Decoding success | Corrupted transmission? | New transport block? |
|---|---|---|---|---|---|---|
| 1 | Yes | 0 | Whole buffer cleared, soft info from transmission 1 added | No | | Yes |
| 2 | No | 1 | Soft info in buffer is soft combined with soft info from transmission 2 | No | | No |
| 3 | No | 2 | Soft info in buffer is soft combined with soft info from transmission 3 | No | | No |
| 4 | No | 3 | Soft info in buffer is soft combined with soft info from transmission 4 | No | | No |
| 5 | No | 0 | Soft info in buffer is soft combined with soft info from transmission 5 | No | | No |
| 6 | No | 1 | | No | 60% of bits replaced by another transmission or damaged due to interference | No |
| 7 | Yes | 1 | Soft info for the last transmission of the bits involved in transmission 7 is cleared from soft buffer. Remaining soft info in buffer is soft combined with soft info from transmission 7 | Yes | | No |

Figure 7:
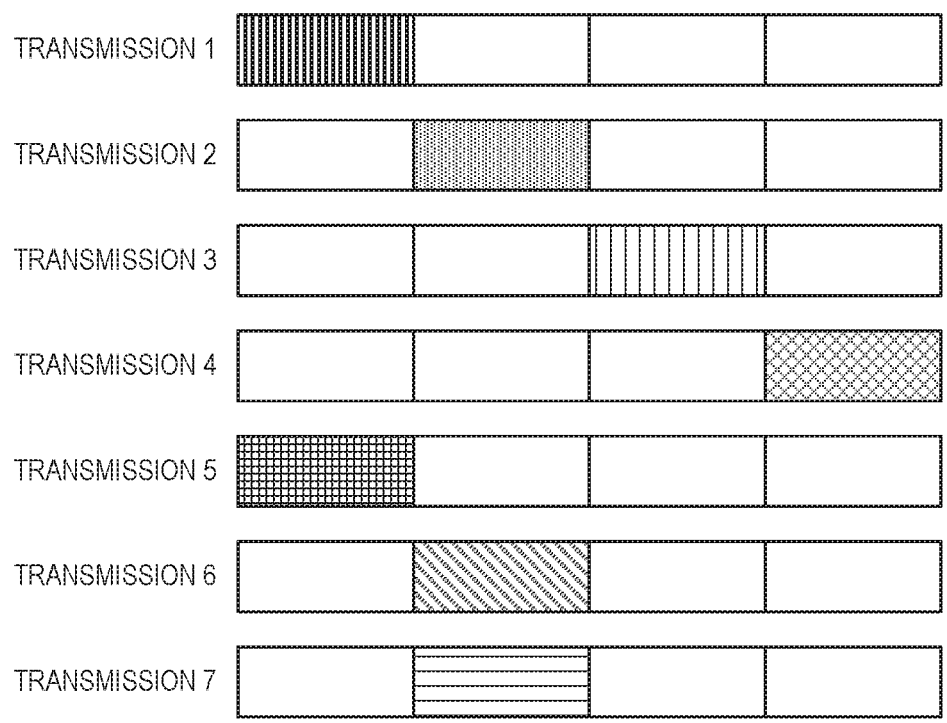

The soft information added to the soft buffer for each transmission is illustrated in FIG. 7. Before the soft information from transmission 7 is combined with the soft information in the buffer, the soft information corresponding to the last transmission of the bits in transmission 7 is cleared from the buffer. That means that the corrupt soft information from transmission 6 is cleared, while the useful soft information from transmission 2 is kept. This is possible if the receiver stores the soft information from the last transmission separate from the rest of the soft buffer.

In case NR uses RV in different ways than LTE, RV 0 in Alternatives 1 and 2 can be replaced by a specific RV, or a set of RVs.

The present disclosure describes embodiments in which RV and NDI are viewed as two separate fields. RV and NDI can also be seen as a jointly encoded field, and in this case the present disclosure can be described by assigning different UE behavior to different values of this jointly encoded field.

The NDI can be seen as a one bit sequence number. The present disclosure works also for a longer sequence number. In this case, toggling the NDI is replaced with increasing the sequence number. This can also be combined with viewing the NDI and RV as a jointly encoded field.

Figure 8:
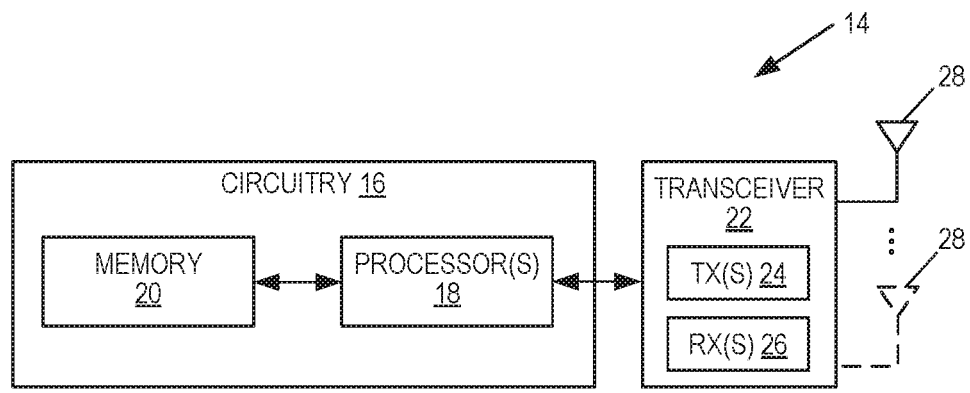
FIGS. 8 and 9 are block diagrams that illustrate a wireless device according to some embodiments of the present disclosure.

FIG. 8 is a schematic block diagram of the wireless device 14 according to some embodiments of the present disclosure. As illustrated, the wireless device 14 includes circuitry 16 comprising one or more processors 18 (e.g., Central Processing Units (CPUs), Application Specific Integrated Circuits (ASICs), Field Programmable Gate Arrays (FPGAs), and/or the like) and memory 20. The wireless device 14 also includes one or more transceivers 22 each including one or more transmitter 24 and one or more receivers 26 coupled to one or more antennas 28. In some embodiments, the functionality of the wireless device 14 described above may be fully or partially implemented in software that is, e.g., stored in the memory 20 and executed by the processor(s) 18.

In some embodiments, a computer program including instructions which, when executed by the at least one processor 18, causes the at least one processor 18 to carry out the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 9:
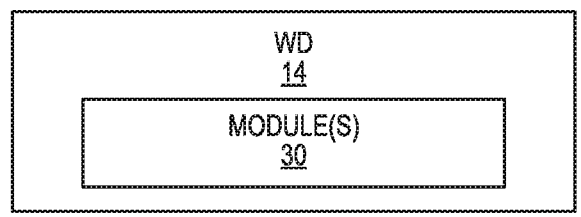

FIG. 9 is a schematic block diagram of the wireless device 14 according to some other embodiments of the present disclosure. The wireless device 14 includes one or more modules 30, each of which is implemented in software. The module(s) 30 provide the functionality of the wireless device 14 described herein. The module(s) 30 may comprise, for example, a receiving module operable to perform step 100 of FIG. 3, a deciding module operable to perform steps 102 and 106 of FIG. 3, and a clearing module operable to perform step 110 of FIG. 3.

Figure 10:
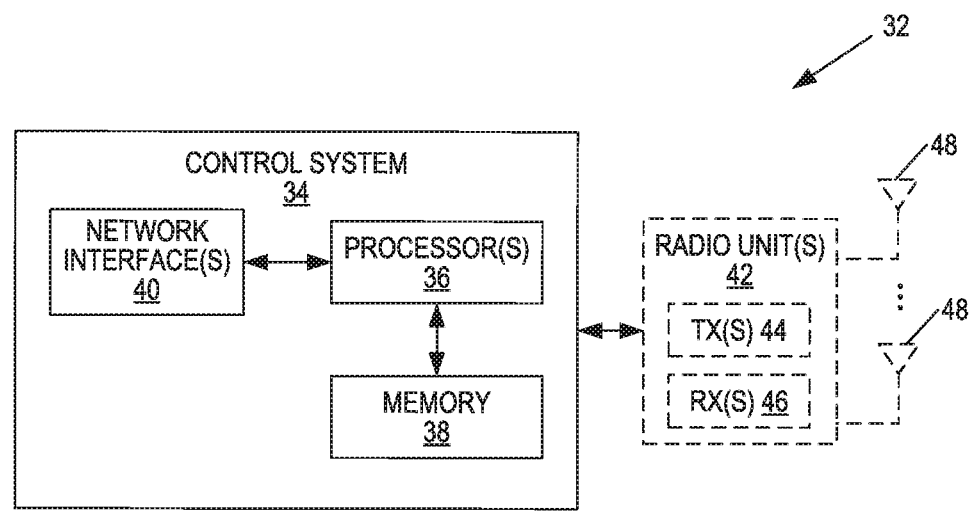
FIGS. 10 through 12 are block diagrams that illustrate a radio access node according to some embodiments of the present disclosure.

FIG. 10 is a schematic block diagram of a network node 32 (e.g., a radio access node 12) according to some embodiments of the present disclosure. As illustrated, the network node 32 includes a control system 34 that includes circuitry comprising one or more processors 36 (e.g., CPUs, ASICs, FPGAs, and/or the like) and memory 38. The control system 34 also includes a network interface 40. In embodiments in which the network node 32 is a radio access node 12, the network node 32 also includes one or more radio units 42 that each include one or more transmitters 44 and one or more receivers 46 coupled to one or more antennas 48. In some embodiments, the functionality of the network node 32 described above may be fully or partially implemented in software that is, e.g., stored in the memory 38 and executed by the processor(s) 36.

Figure 11:
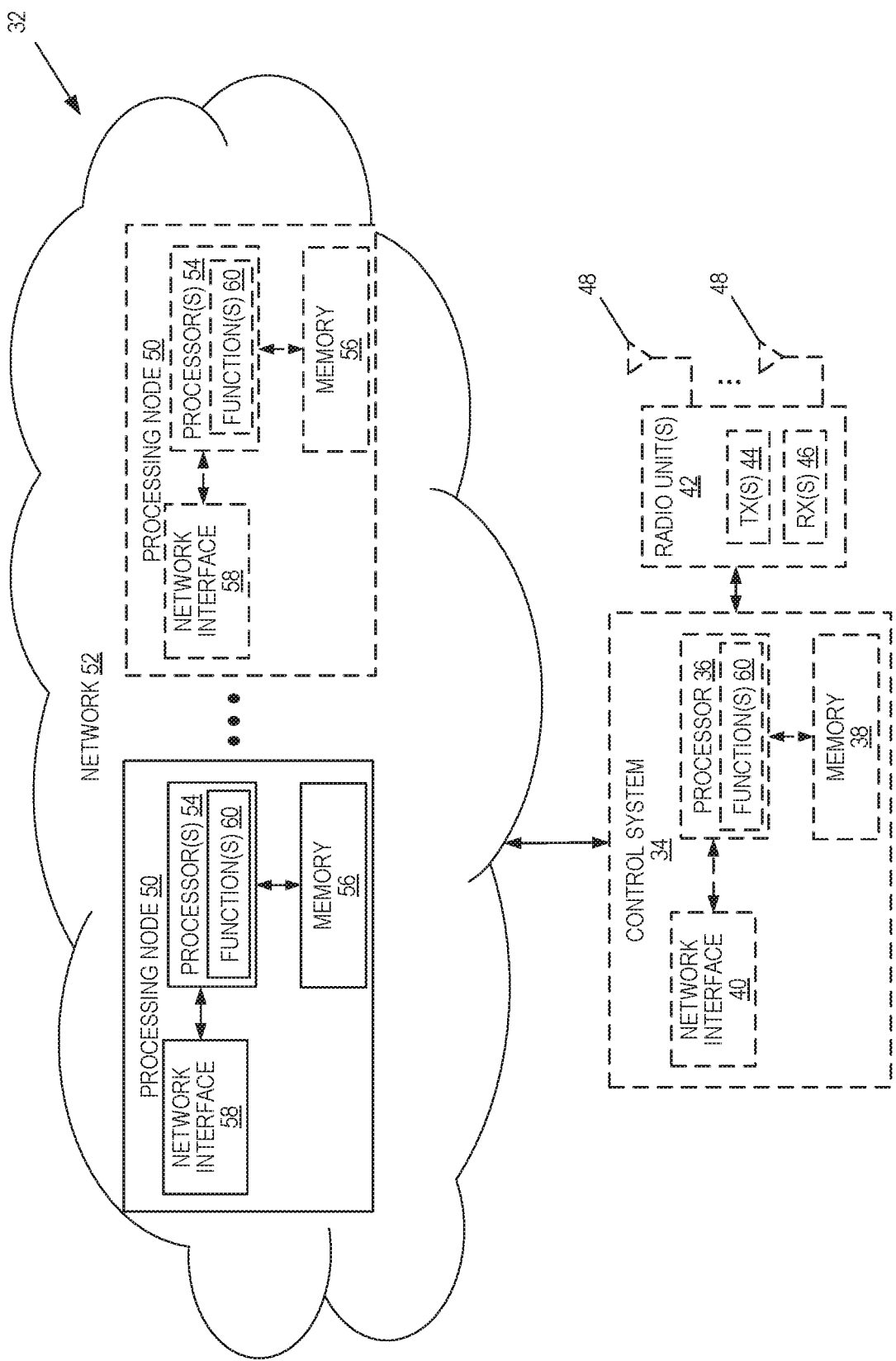

FIG. 11 is a schematic block diagram that illustrates a virtualized embodiment of the network node 32 (e.g., the radio access node 12) according to some embodiments of the present disclosure. As used herein, a "virtualized" network node 32 is a network node 32 in which at least a portion of the functionality of the network node 32 is implemented as a virtual component (e.g., via a virtual machine(s) executing on a physical processing node(s) in a network(s)). As illustrated, the network node 32 optionally includes the control system 34, as described with respect to FIG. 10. In addition, if the network node 32 is the radio access node 12, the network node 32 also includes the one or more radio units 42, as described with respect to FIG. 10. The control system 34 (if present) is connected to one or more processing nodes 50 coupled to or included as part of a network(s) 52 via the network interface 40. Alternatively, if the control system 34 is not present, the one or more radio units 42 (if present) are connected to the one or more processing nodes 50 via a network interface(s). Alternatively, all of the functionality of the network node 32 described herein may be implemented in the processing nodes 50 (i.e., the network node 32 does not include the control system 34 or the radio unit(s) 42). Each processing node 50 includes one or more processors 54 (e.g., CPUs, ASICs, FPGAs, and/or the like), memory 56, and a network interface 58.

In this example, functions 60 of the network node 32 described herein are implemented at the one or more processing nodes 50 or distributed across the control system 34 (if present) and the one or more processing nodes 50 in any desired manner. In some particular embodiments, some or all of the functions 60 of the network node 32 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 (if present) is used in order to carry out at least some of the desired functions. Notably, in some embodiments, the control system 34 may not be included, in which case the radio unit(s) 42 (if present) communicates directly with the processing node(s) 50 via an appropriate network interface(s).

In some embodiments, a computer program including instructions which, when executed by the at least one processor 36, 54, causes the at least one processor 36, 54 to carry out the functionality of the network node 32 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 56).

Figure 12:
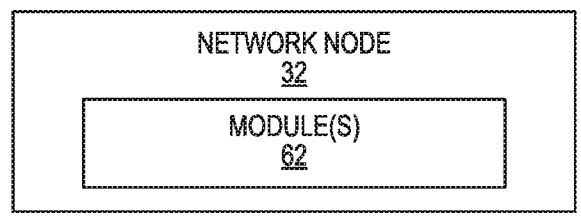

FIG. 12 is a schematic block diagram of the network node 32 (e.g., the radio access node 12) according to some other embodiments of the present disclosure. The network node 32 includes one or more modules 62, each of which is implemented in software. The module(s) 62 provide the functionality of the network node 32 described herein. The module(s) 62 may comprise a include a transmitting module operable to transmit or cause another node to transmit to a wireless device 14 information that is pertaining to whether the wireless device 14 is to partially clear a soft buffer for a current HARQ process, as described above. As described above, this information is comprised in the control information, e.g. the DCI. In some embodiments, this information is a NDI and RV indicator. In other embodiments, this information comprises a bit added to the control information to indicate whether the control information points to an actual downlink transmission or whether the wireless device 14 is to partially clear the soft buffer for the current HARQ process, as described above.

EXAMPLE EMBODIMENTS

While not being limited thereto, some example embodiments of the present disclosure are provided below.

Embodiment 1

A method for a wireless device (14) in a wireless communications system (10), comprising: receiving (100) control information comprising information pertaining to whether the wireless device (14) should partially clear a soft buffer for a current HARQ process; deciding (102, 106) whether to partially clear the soft buffer for the current HARQ process based on the information comprised in the control information; and upon deciding (102, 106) to partially clear the soft buffer for the current HARQ process, partially clearing (110) the soft buffer for the current HARQ process.

Embodiment 2

The method of embodiment 1 wherein the information pertaining to whether the wireless device (14) should partially clear the soft buffer for the current HARQ process comprises a NDI and a RV indicator.

Embodiment 3

The method of embodiment 2 wherein deciding (102, 106) whether to partially clear the soft buffer for the current HARQ process comprises deciding (102, 106) to partially clear the soft buffer for the current HARQ process if a combination of the NDI and the RV indicator is a predefined combination.

Embodiment 4

The method of embodiment 2 wherein deciding (102, 106) whether to partially clear the soft buffer for the current HARQ process comprises deciding (102, 106) to partially clear the soft buffer for the current HARQ process if the NDI is toggled and the RV indicator indicates a RV other than RV 0.

Embodiment 5

The method of embodiment 1 wherein the information pertaining to whether the wireless device (14) should partially clear the soft buffer for the current HARQ process comprises a bit that indicates whether the control information points to an actual downlink transmission or the wireless device (14) should partially clear the soft buffer.

Embodiment 6

The method of embodiment 5 wherein, if the bit indicates that the wireless device (14) should partially clear the soft buffer, the control information further comprises one or more bits that indicate where to start clearing the soft buffer.

Embodiment 7

The method of embodiment 6 wherein the one or more bits that indicate where to start clearing the soft buffer comprises one or more bits normally used for a NDI, one or more bits normally used to indicate MCS for an associated transport block, and/or one or more bits normally used to indicate time-frequency resources in which an associated transport block is transmitted.

Embodiment 8

The method of embodiment 7 wherein partially clearing the soft buffer comprises partially clearing the soft buffer starting at location in the soft buffer indicated by the one or more bits.

Embodiment 9

The method of any one of embodiments 1 to 8 wherein partially clearing (110) the soft buffer for the current HARQ process comprises clearing (110) parts of the soft buffer for the current HARQ process that correspond to coded bits in a current downlink transmission.

Embodiment 10

The method of any one of embodiments 1 to 8 wherein partially clearing (110) the soft buffer for the current HARQ process comprises clearing (110) soft information that corresponds to a latest downlink transmission (transmission T-1) that corresponds to the coded bits for the current downlink transmission (transmission T) but not soft information from the soft buffer for transmissions (transmissions T-2, T-3, . . . ) occurring before the latest transmission.

Embodiment 11

The method of any one of embodiments 1 to 10 further comprising receiving (110) a current downlink transmission and performing (110) soft combining and decoding of the current downlink transmission.

Embodiment 12

The method of any one of embodiments 1 to 11 wherein the information pertaining to whether the wireless device (14) should partially clear the soft buffer for the current HARQ process comprises a NDI and a RV indicator, and the NDI and the RV indicator are separate indicators.

Embodiment 13

The method of any one of embodiments 1 to 11 wherein the information pertaining to whether the wireless device (14) should partially clear the soft buffer for the current HARQ process comprises a NDI and a RV indicator, and the NDI and the RV indicator are a combined (e.g., jointly encoded) indicator.

Embodiment 14

The method of embodiment 12 or 13 wherein the NDI comprises more than one bit (e.g., a sequence number) such that the NDI is toggled when the NDI changes values.

Embodiment 15

A wireless device (14) for a wireless communications system (10), the wireless device (14) adapted to operate according to the method of any one of embodiments 1 to 14.

Embodiment 16

A wireless device (14) for a wireless communications system (10) comprising: at least one transceiver (22); at least one processor (18); and memory (20) comprising instructions executable by the at least one processor (18) whereby the wireless device (14) is operable to perform the method of any one of embodiments 1 to 14.

Embodiment 17

A wireless device (14) for a wireless communications system (10) comprising: a receiving module (30) operable to receive control information comprising information pertaining to whether the wireless device (14) should partially clear a soft buffer for a current HARQ process; a deciding module (30) operable to decide whether to partially clear the soft buffer for the current HARQ process based on the information comprised in the control information; and a clearing module (30) operable to, upon the deciding module (30) making a decision to partially clear the soft buffer for the current HARQ process, partially clear the soft buffer for the current HARQ process.

Embodiment 18

A method for a network node (12) in a wireless communications system (10), comprising: transmitting, to a wireless device (14), or causing another network node to transmit, to the wireless device (14), information pertaining to whether the wireless device (14) is to partially clear a soft buffer for a current HARQ process.

Embodiment 19

The method of embodiment 18 wherein the information pertaining to whether the wireless device (14) is to partially clear the soft buffer for the current HARQ process comprises a NDI and a RV indicator.

Embodiment 20

The method of embodiment 19 wherein transmitting the information comprises transmitting control information comprising the NDI and the RV indicator such that a combination of the NDI and the RV indicator is a predefined combination that indicates that the wireless device (14) is to partially clear the soft buffer for the current HARQ process.

Embodiment 21

The method of embodiment 19 wherein transmitting the information comprises transmitting control information comprising the NDI and the RV indicator such that the NDI is toggled and the RV indicator indicates a RV other than RV 0 to thereby indicate that the wireless device (14) is to partially clear the soft buffer for the current HARQ process.

Embodiment 22

The method of embodiment 18 wherein the information pertaining to whether the wireless device (14) should partially clear the soft buffer for the current HARQ process comprises a bit that indicates whether control information comprising the information points to an actual downlink transmission or the wireless device (14) should partially clear the soft buffer.

Embodiment 23

The method of embodiment 22 wherein, if the bit indicates that the wireless device (14) should partially clear the soft buffer, transmitting the control information further comprises transmitting the control information such that the control information comprises one or more bits that indicate where to start clearing the soft buffer.

Embodiment 24

The method of embodiment 23 wherein the one or more bits that indicate where to start clearing the soft buffer comprises one or more bits normally used for a NDI, one or more bits normally used to indicate MCS for an associated transport block, and/or one or more bits normally used to indicate time-frequency resources in which an associated transport block is transmitted.

Embodiment 25

A network node (12) for a wireless communications system (10) adapted to perform the method of any one of embodiments 18 to 24.

Embodiment 26

A network node (12, 32) for a wireless communications system (10) comprising: at least one processor (36); and memory (38) comprising instructions executable by the at least one processor (36) whereby the network node (12, 32) is operable to perform the method of any one of embodiments 18 to 24.

Embodiment 27

A network node (12, 32) for a wireless communications system (10) comprising: a transmitting module (62) operable to transmit, to a wireless device (14), or cause another network node to transmit, to the wireless device (14), information pertaining to whether the wireless device (14) is to partially clear a soft buffer for a current HARQ process.

Acronyms

The following acronyms are used throughout this disclosure.
- 3GPP Third Generation Partnership Project
- 5G Fifth Generation
- ACK Acknowledgement
- ASIC Application Specific Integrated Circuit
- CC Chase Combining
- CPU Central Processing Unit
- CRC Cyclic Redundancy Check
- DCI Downlink Control Information
- eMBB Enhanced Mobile Broadband
- eNB Enhanced or Evolved Node B
- FPGA Field Programmable Gate Array
- gNB New Radio Base Station
- HARQ Hybrid Automatic Repeat Request
- IR Incremental Redundancy
- LDPC Low-Density Parity-Check
- LLR Log-Likelihood Ratio
- LTE Long Term Evolution
- MCS Modulation and Coding Scheme
- MME Mobility Management Entity
- MTC Machine Type Communication
- NACK Negative Acknowledgement
- NDI New Data Indicator
- NR New Radio
- PDCCH Physical Downlink Control Channel
- PDN Packet Data Network
- PDSCH Physical Downlink Shared Channel
- P-GW Packet Data Network Gateway
- RV Redundancy Version
- SCEF Service Capability Exposure Function
- SRS Sounding Reference Signal
- UE User Equipment
- URLLC Ultra-Reliable and Low-Latency Communications Those skilled in the art will recognize improvements and modifications to the embodiments of the present disclosure. All such improvements and modifications are considered within the scope of the concepts disclosed herein.

What is claimed is:

1. A method for a wireless device in a wireless communications system, comprising:
   receiving control information comprising information pertaining to whether the wireless device should partially clear a soft buffer for a Hybrid Automatic Repeat Request, HARQ, process, the information pertaining to whether the wireless device should partially clear the soft buffer for the HARQ process comprising a New Data Indicator, NDI, and a Redundancy Version, RV, indicator;

deciding whether to partially clear the soft buffer for the HARQ process based on whether the NDI and the RV indicator is a predefined combination; and upon deciding to partially clear the soft buffer for the HARQ process, partially clearing the soft buffer for the HARQ process.

2. The method of claim 1 wherein HARQ feedback is provided for each code block, and partially clearing the soft buffer for the HARQ process comprises clearing, from the soft buffer, parts of soft information stored in the soft buffer that correspond to a code block.

3. The method of claim 1 wherein deciding whether to partially clear the soft buffer for the HARQ process comprises deciding to partially clear the soft buffer for the HARQ process when a combination of the NDI and the RV indicator is the predefined combination.

4. The method of claim 1 wherein deciding whether to partially clear the soft buffer for the HARQ process comprises deciding to partially clear the soft buffer for the HARQ process when the NDI is toggled and the RV indicator indicates a RV other than RV 0.

5. The method of claim 1 wherein:
the information pertaining to whether the wireless device should partially clear the soft buffer for the HARQ process comprises information that informs the wireless device of which bits represented by soft information in the soft buffer have been corrupted; and
partially clearing the soft buffer for the HARQ process comprises clearing a part of the soft buffer that corresponds to the bits that have been corrupted.

6. The method of claim 5 wherein the bits that have been corrupted are bits that were punctured by Ultra-Reliable and Low-Latency Communications, URLLC.

7. The method of claim 1 wherein the information pertaining to whether the wireless device should partially clear the soft buffer for the HARQ process comprises a bit that indicates whether the control information points to an actual downlink transmission or the wireless device should partially clear the soft buffer.

8. The method of claim 7 wherein, when the bit indicates that the wireless device should partially clear the soft buffer, the control information further comprises one or more bits that indicate where to start clearing the soft buffer.

9. The method of claim 8 wherein the one or more bits that indicate where to start clearing the soft buffer comprises one or more bits normally used for the NDI, one or more bits normally used to indicate a Modulation and Coding Scheme, MCS, for an associated transport block, and/or one or more bits normally used to indicate time-frequency resources in which an associated transport block is transmitted.

10. The method of claim 9 wherein partially clearing the soft buffer comprises partially clearing the soft buffer starting at a location in the soft buffer indicated by the one or more bits.

11. The method of claim 1 wherein partially clearing the soft buffer for the HARQ process comprises clearing parts of the soft buffer for the HARQ process that correspond to coded bits in a downlink transmission.

12. The method of claim 1 wherein partially clearing the soft buffer for the HARQ process comprises clearing soft information that corresponds to a latest downlink transmission that corresponds to coded bits for a downlink transmission but not soft information from the soft buffer for transmissions occurring before the latest downlink transmission.

13. The method of claim 1 further comprising receiving a downlink transmission and performing soft combining and decoding of the downlink transmission.

14. The method of claim 1 wherein the information pertaining to whether the wireless device should partially clear the soft buffer for the HARQ process comprises the NDI and the RV indicator, and the NDI and the RV indicator are separate indicators.

15. The method of claim 14 wherein the NDI comprises more than one bit such that the NDI is toggled when the NDI changes values.

16. The method of claim 1 wherein the information pertaining to whether the wireless device should partially clear the soft buffer for the HARQ process comprises the NDI and the RV indicator, and the NDI and the RV indicator are a jointly encoded indicator.

17. A wireless device for a wireless communications system comprising:
at least one transceiver;
at least one processor; and
memory comprising instructions executable by the at least one processor whereby the wireless device is operable to:
receive control information comprising information pertaining to whether the wireless device should partially clear a soft buffer for a Hybrid Automatic Repeat Request, HARQ, process, the information pertaining to whether the wireless device should partially clear the soft buffer for the HARQ process comprising a New Data Indicator, NDI, and a Redundancy Version, RV, indicator;
decide whether to partially clear the soft buffer for the HARQ process based on whether the NDI and the RV indicator is a predefined combination; and
upon deciding to partially clear the soft buffer for the HARQ process, partially clearing the soft buffer for the HARQ process.

18. A method for a network node in a wireless communications system, comprising:
transmitting, to a wireless device, or causing another network node to transmit, to the wireless device, information pertaining to whether the wireless device is to partially clear a soft buffer for a Hybrid Automatic Repeat Request, HARQ, process, the information pertaining to whether the wireless device is to partially clear the soft buffer for the HARQ process comprising a New Data Indicator, NDI, and a Redundancy Version, RV, indicator, wherein a combination of the NDI and RV indicator set to a predefined combination indicates that the wireless device is to partially clear the soft buffer for the HARQ process.

19. The method of claim 18 wherein HARQ feedback is provided for each code block, and partially clearing the soft buffer for the HARQ process comprises clearing, from the soft buffer, parts of soft information stored in the soft buffer that correspond to a code block.

20. The method of claim 18 wherein transmitting the information comprises transmitting control information comprising the NDI and the RV indicator such that the NDI is toggled and the RV indicator indicates a RV other than RV 0 to thereby indicate that the wireless device is to partially clear the soft buffer for the HARQ process.

21. The method of claim 18 wherein the information pertaining to whether the wireless device should partially clear the soft buffer for the HARQ process comprises information that informs the wireless device of which bits represented by soft information in the soft buffer have been corrupted.

22. The method of claim 21 wherein the bits that have been corrupted are bits that were punctured by Ultra-Reliable and Low-Latency Communications, URLLC.

23. The method of claim 18 wherein the information pertaining to whether the wireless device should partially clear the soft buffer for the HARQ process comprises a bit that indicates whether control information comprising the information points to an actual downlink transmission or the wireless device should partially clear the soft buffer.

24. The method of claim 23 wherein, when the bit indicates that the wireless device should partially clear the soft buffer, transmitting the control information further comprises transmitting the control information such that the control information comprises one or more bits that indicate where to start clearing the soft buffer.

25. The method of claim 24 wherein the one or more bits that indicate where to start clearing the soft buffer comprises one or more bits normally used for the NDI, one or more bits normally used to indicate a Modulation and Coding Scheme, MCS, for an associated transport block, and/or one or more bits normally used to indicate time-frequency resources in which an associated transport block is transmitted.

26. The method of claim 18 wherein the information pertaining to whether the wireless device should partially clear the soft buffer for the HARQ process comprises the NDI and the RV indicator, and the NDI and the RV indicator are a jointly encoded indicator.

27. A network node for a wireless communications system comprising:
    at least one processor; and
    memory comprising instructions executable by the at least one processor whereby the network node is operable to:
        transmit, to a wireless device, or causing another network node to transmit, to the wireless device, information pertaining to whether the wireless device is to partially clear a soft buffer for a Hybrid Automatic Repeat Request, HARQ, process, the information pertaining to whether the wireless device is to partially clear the soft buffer for the HARQ process comprising a New Data Indicator, NDI, and a Redundancy Version, RV, indicator, wherein a combination of the NDI and RV indicator set to a predefined combination indicates that the wireless device is to partially clear the soft buffer for the HARQ process.

\* \* \* \* \*